(12) United States Patent
Alahyari

(10) Patent No.: US 12,474,095 B2
(45) Date of Patent: Nov. 18, 2025

(54) COMPACT RADIAL CONDENSER

(71) Applicant: B/E Aerospace, Inc., Winston Salem, NC (US)

(72) Inventor: Abbas A. Alahyari, Glastonbury, CT (US)

(73) Assignee: B/E AEROSPACE, INC., Winston Salem, NC (US)

( * ) Notice: Subject to any disclaimer, the term of this patent is extended or adjusted under 35 U.S.C. 154(b) by 428 days.

(21) Appl. No.: 18/075,233

(22) Filed: Dec. 5, 2022

(65) Prior Publication Data
US 2024/0183589 A1  Jun. 6, 2024

(51) Int. Cl.
*F25B 39/04* (2006.01)
*F28D 21/00* (2006.01)
*F28F 3/02* (2006.01)

(52) U.S. Cl.
CPC .............. *F25B 39/04* (2013.01); *F28D 21/00* (2013.01); *F28F 3/02* (2013.01); *F28D 2021/0021* (2013.01); *F28F 2250/08* (2013.01)

(58) Field of Classification Search
CPC .................................. F25B 39/04; F28D 1/024
See application file for complete search history.

(56) References Cited

U.S. PATENT DOCUMENTS

| | | | |
|---|---|---|---|
| 3,469,625 A * | 9/1969 | Phillips | F28F 3/02 165/125 |
| 4,260,015 A * | 4/1981 | Tamburini | F28B 1/02 165/110 |
| 6,796,370 B1 | 9/2004 | Doll | |
| 8,199,505 B2 | 6/2012 | Dede | |
| 2007/0246205 A1 | 10/2007 | Lee et al. | |
| 2009/0165489 A1* | 7/2009 | Mongia | F25B 39/04 62/305 |
| 2019/0264960 A1* | 8/2019 | Schroeder | F25B 13/00 |
| 2022/0146213 A1 | 5/2022 | Saviers et al. | |

FOREIGN PATENT DOCUMENTS

CN  113921482 A  *  1/2022
DE  102014018703     6/2016

OTHER PUBLICATIONS

European Patent Office, European Search Report dated Apr. 2, 2024 in Application No. 23212338.0.
European Patent Office, European Office Action dated Mar. 25, 2025 in Application No. 23212338.0.

* cited by examiner

*Primary Examiner* — Eric S Ruppert
(74) *Attorney, Agent, or Firm* — SNELL & WILMER L.L.P.

(57) ABSTRACT

A compact radial condenser is disclosed. The compact radial condenser includes a first plate; a second plate; and a plurality of structures disposed between the first plate and the second plate. In the compact radial condenser, heat from a first fluid flowing between the first plate and the second plate and around the plurality of structures is transferred from the first fluid to at least one of the first plate, the second plate, or the plurality of structures. In the compact radial condenser, the plurality of structures includes a first set of structures, the first set of structures extending radially from an inner edge of an opening in the first plate to an outer edge of the first plate.

18 Claims, 9 Drawing Sheets

COMPACT RADIAL CONDENSER

FIELD

The present disclosure generally relates to refrigerant condensers, and more particularly, to compact radial condensers.

BACKGROUND

Air-cooled refrigerant condensers are used in heat exchange systems, such as refrigeration or air conditioning, among others. In these heat exchange systems, a refrigerant in superheated vapor phase transitions into a subcooled liquid through a condenser. These condensers are typically of a fin-tube, microchannel, or plate fin heat exchanger construction. Further, Microtechnologies for Air-Cooled Exchangers (MACE) air-cooled heat exchangers provide efficient and compact heat transfer for local cooling applications.

SUMMARY

A compact radial condenser is disclosed herein. The compact radial condenser includes a first plate; a second plate; and a plurality of structures disposed between the first plate and the second plate. In the compact radial condenser, heat from a first fluid flowing between the first plate and the second plate and around the plurality of structures is transferred from the first fluid to at least one of the first plate, the second plate, or the plurality of structures. In compact radial condenser, the plurality of structures includes a first set of structures, the first set of structures extending radially from an inner edge of an opening in the first plate to an outer edge of the first plate.

In various embodiments, the plurality of structures further includes a second set of structures, the second set of structures extending radially a distance D from the inner edge of the opening in the first plate to the outer edge of the first plate. In various embodiments, the plurality of structures are configured to provide a density of passages between the plurality of structures that optimizes a flow of the first fluid as the first fluid transitions from a gaseous state to a liquid state. In various embodiments, the first plate and the second plate are circular disk shaped, where the first plate includes the opening in a center of the first plate and where the second plate is a solid. In various embodiments, the first plate, the second plate, and the plurality of structures are manufactured from a thermally conductive material and the thermally conductive material is at least one of aluminum, copper, titanium, Inconel alloy, a thermally conductive polymer, or a thermally enhanced polymer. In various embodiments, a first edge of each of the plurality of structures is coupled to a first side of the first plate and a second edge of each of the plurality of structures is coupled to a first side of the second plate.

In various embodiments, the compact radial condenser further includes an impeller and a plurality of cooling fins. In various embodiments, the plurality of cooling fins are coupled to a second side of the second plate and the impeller draws in a second fluid and rejects the second fluid out through spaces between the plurality of cooling fins. In various embodiments, the impeller is disposed in a center of the second side of the second plate and the plurality of cooling fins extend radially outward from an outer radial edge of the impeller to an outer edge of the second plate. In various embodiments, the plurality of cooling fins are configured to have a radius R1 as the plurality of cooling fins extend radially outward from the outer radial edge of the impeller to the outer edge of the second plate. In various embodiments, the first fluid is refrigerant, and the second fluid is air. In various embodiments, the plurality of cooling fins are manufactured from a thermally conductive material and the thermally conductive material is at least one of aluminum, copper, titanium, Inconel alloy, a thermally conductive polymer, or a thermally enhanced polymer.

Also disclosed herein is a heat transfer system. The heat transfer system includes an expansion device; a heat exchanger that is fluidly coupled to the expansion device; a compressor that is fluidly coupled to the heat exchanger; and a compact radial condenser that is fluidly coupled to the expansion device and the compressor. In the heat transfer system, the compact radial condenser includes: a first plate; a second plate; and a plurality of structures disposed between the first plate and the second plate. In the compact radial condenser, heat from a first fluid flowing between the first plate and the second plate and around the plurality of structures is transferred from the first fluid to at least one of the first plate, the second plate, or the plurality of structures. In the compact radial condenser, the plurality of structures includes a first set of structures, the first set of structures extends radially from an inner edge of an opening in the first plate to an outer edge of the first plate.

In various embodiments, the plurality of structures further includes a second set of structures, the second set of structures extending radially a distance D from the inner edge of the opening in the first plate to the outer edge of the first plate. In various embodiments, the plurality of structures are configured to provide a density of passages between the plurality of structures that optimizes a flow of the first fluid as the first fluid transitions from a gaseous state to a liquid state. In various embodiments, the first plate and the second plate are circular disk shaped, the first plate including the opening in a center of the first plate, and the second plate is solid. In various embodiments, the first plate, the second plate, and the plurality of structures are manufactured from a thermally conductive material, and the thermally conductive material is at least one of aluminum, copper, titanium, Inconel alloy, a thermally conductive polymer, or a thermally enhanced polymer. In various embodiments, a first edge of each of the plurality of structures is coupled to a first side of the first plate and a second edge of each of the plurality of structures is coupled to a first side of the second plate.

In various embodiments, the heat transfer system further includes: an impeller; and a plurality of cooling fins. In various embodiments, the plurality of cooling fins are coupled to a second side of the second plate and the impeller draws in a second fluid and rejects the second fluid out through spaces between the plurality of cooling fins. In various embodiments, the impeller is disposed in a center of the second side of the second plate and the plurality of cooling fins extend radially outward from an outer radial edge of the impeller to an outer edge of the second plate. In various embodiments, the plurality of cooling fins are configured to have a radius R1 as the plurality of cooling fins extend radially outward from the outer radial edge of the impeller to the outer edge of the second plate. In various embodiments, the first fluid is refrigerant, and the second fluid is air. In various embodiments, the plurality of cooling fins are manufactured from a thermally conductive material and the thermally conductive material is at least one of aluminum, copper, titanium, Inconel alloy, a thermally conductive polymer, or a thermally enhanced polymer.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a compact radial condenser. In various embodiments, a circular heat exchanger with radially outward airflow and a baseplate is combined with a radially inward refrigerant flow arrangement. In various embodiments, the radially inward refrigerant flow passages are embedded in a base of the circular heat exchanger. In various embodiments, the radially inward refrigerant flow arrangement for the compact radial condenser provides an improvement over current heat exchanger configurations since the reduction in flow area compensates for reduction in volumetric flow as vapor condenses into liquid, thereby maintaining a high flow velocity and effective heat transfer. In various embodiments, various complex flow passages may be incorporated within the compact radial condenser through additive fabrication of the baseplate. In various embodiments, interrupted surfaces within the compact radial condenser may produce thin liquid film and high condensation heat transfer.

Figure 1:
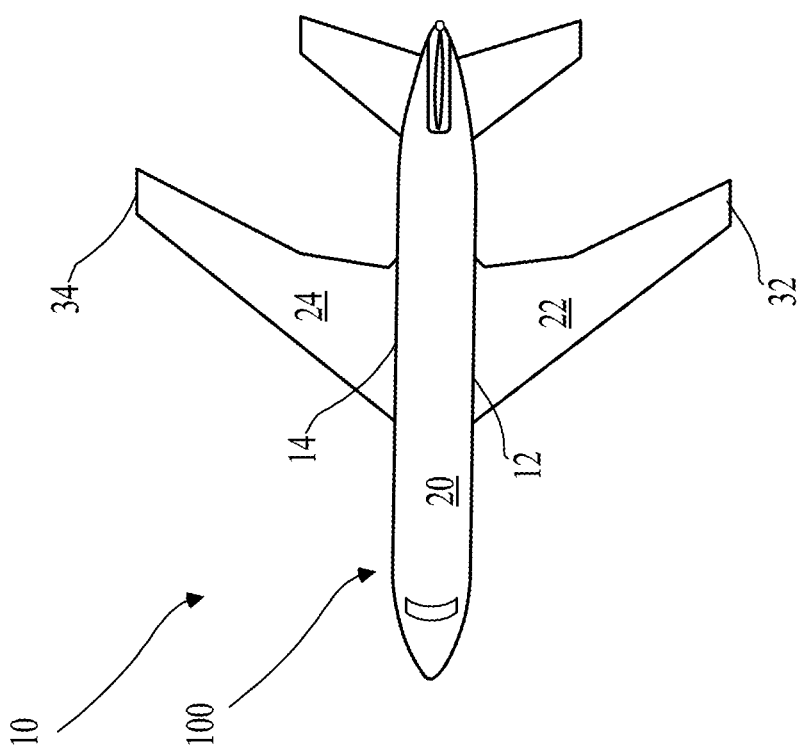
FIG. 1 illustrates an aircraft having an HVAC system disposed therein, in accordance with various embodiments.

Referring now to FIG. 1, an aircraft 10 having an HVAC system 100 disposed therein is illustrated in accordance with various embodiments. The aircraft comprises a fuselage 20, wings 22, 24, each wing 22, 24 extending from a root 12, 14 disposed at the fuselage 20 to a tip 32, 34 disposed distal to the fuselage 20. In various embodiments, the HVAC system 100 is disposed at least partially within the fuselage 20. In this regard, the HVAC system 100 is configured to provide environmental control systems such as cooling air into a cabin of the fuselage 20 during operation of the aircraft 10, and refrigeration systems, among others. Although described as being in an aircraft 10, the HVAC system 100 is not limited in this regard. For example, the HVAC system 100 may be disposed in a building, a house, a commercial residence, a private residence, or the like and still be within the scope of this disclosure.

Figure 2:
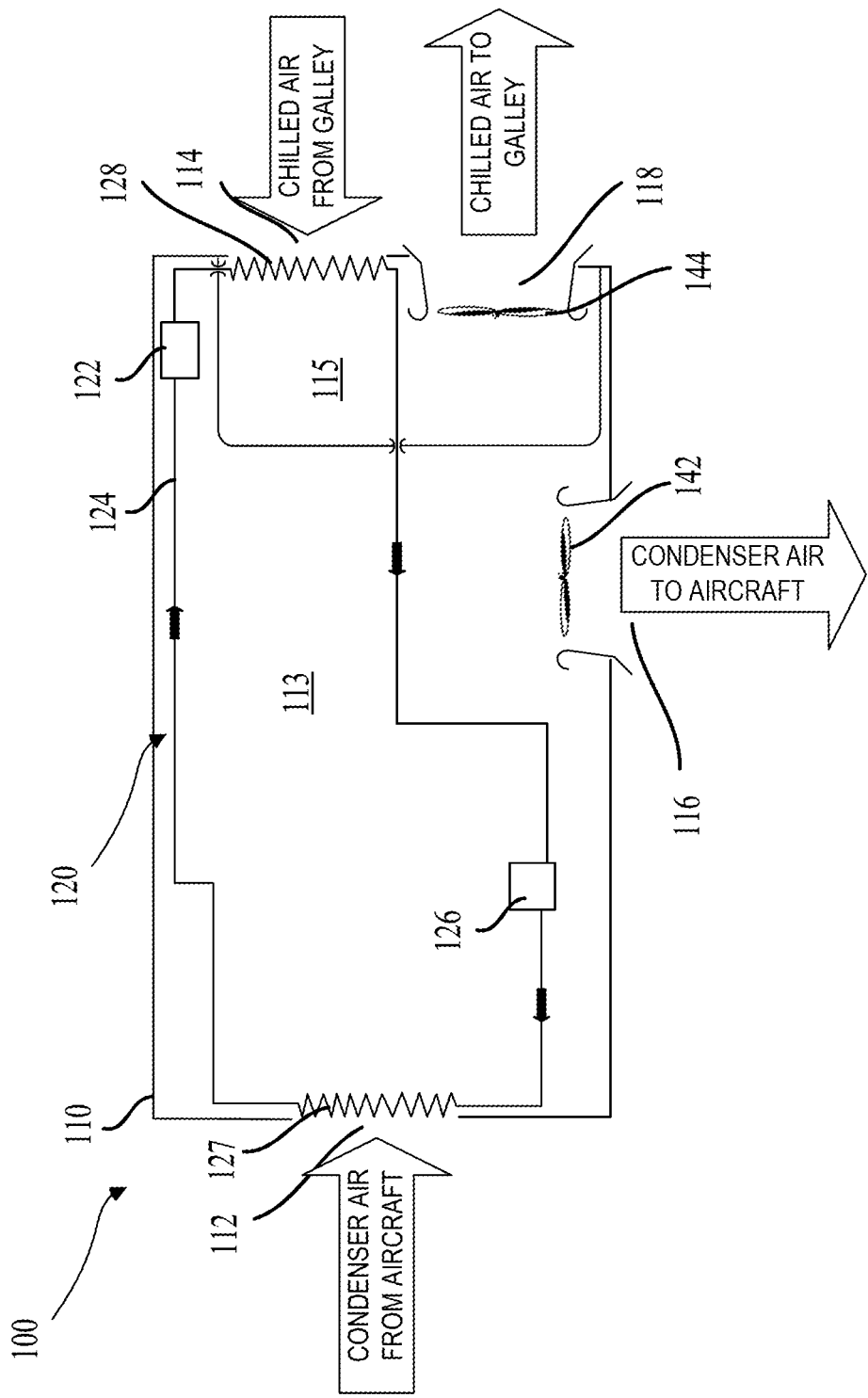
FIG. 2 illustrates a schematic view of a HVAC system, in accordance with various embodiments.

Referring now to FIG. 2, a schematic view of the HVAC system 100 is illustrated, in accordance with various embodiments. The HVAC system 100 comprises a housing 110, a plumbing system 120, and fans 142, 144. In various embodiments, the plumbing system 120 is disposed within the housing 110. In various embodiments, the housing 110 defines inlet ports 112, 114 and outlet ports 116, 118. In various embodiments, the plumbing system 120 comprises an expansion device 122, fluid conduits 124, a compressor 126, a compact radial condenser 127 and a heat exchanger 128. In various embodiments, the compact radial condenser 127 is disposed proximate the inlet port 112 and the heat exchanger 128 is disposed proximate the inlet port 114. In various embodiments, the fan 142 is disposed within the outlet port 116 and the fan 144 is disposed within the outlet port 118. In various embodiments, the fan 142 may be disposed adjacent to compact radial condenser 127 and the fan 144 may be disposed adjacent to heat exchanger 128.

In various embodiments, during operation of the HVAC system 100, second fluid, i.e. referred to as air hereafter, flows through the inlet port 112 (i.e., pulled in via the fan 142) into cavity 113. In response to flowing through the inlet port 112, first fluid, i.e. referred to as refrigerant hereafter, flows through the compact radial condenser 127, which adds heat to the airflow and thus heating the airflow. The heated airflow is then released out the outlet port 116 back to a cabin in the fuselage 20 of the aircraft 10 from FIG. 1. Similarly, chilled air from a galley of the aircraft 10 from FIG. 1 may be pulled through the inlet port 114 into a cavity 115 via the fan 144, and then released back into the galley through outlet port 118. In this regard, the air traveling through the inlet port 114 is cooled in a reverse manner to the airflow travelling through the inlet port 112.

In various embodiments, during operation, a refrigerant travels through plumbing system 120. In this regard, the refrigerant travels through the expansion device 122. The expansion device 122 controls an amount of refrigerant and rapidly reduces the refrigerant pressure and temperature released to an evaporator section of the plumbing system 120, in accordance with various embodiments. After going through the expansion device 122, the refrigerant travels through the heat exchanger 128 which transitions the refrigerant from a liquid state to a gas state in response to heat being absorbed from the chilled air coming from the galley of the aircraft 10 from FIG. 1. After traveling through the heat exchanger 128, the refrigerant, in the gas state, travels through the compressor 126 then upstream to the compact radial condenser 127. The compressor 126 performs work on the refrigerant raising its pressure and temperature. Then, the refrigerant, pumped by the compressor 126, travels through the compact radial condenser 127, where heat is removed from the refrigerant to condense it, and heat is transferred to the air entering the inlet port 112 by the refrigerant, which transitions back from the gas state into the liquid state.

Figure 3:
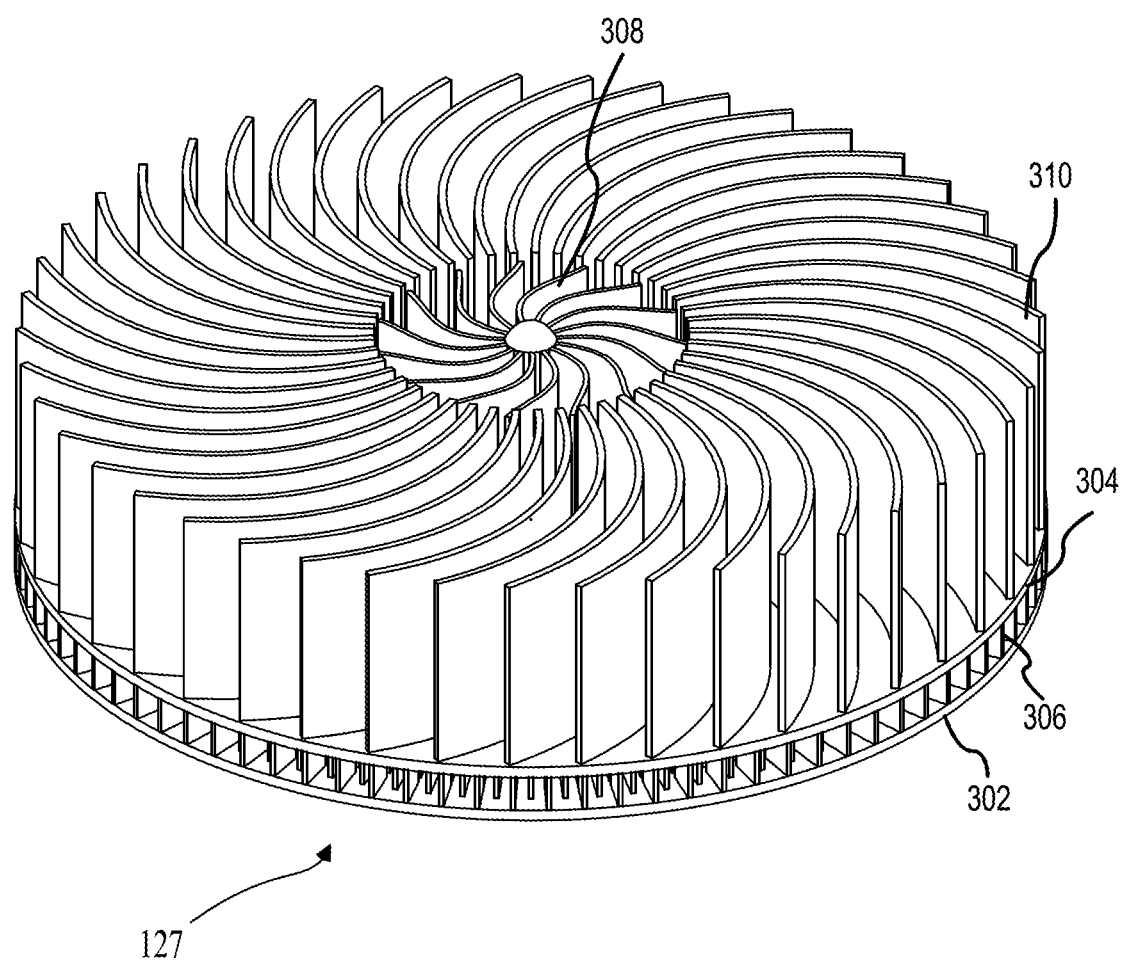
FIG. 3 illustrates an isometric view of a condenser of a HVAC system, in accordance with various embodiments.

Referring now to FIG. 3, an isometric view of the compact radial condenser 127 of the HVAC system is illustrated, in accordance with various embodiments. In various embodiments, compact radial condenser 127 includes a first plate 302 and a second plate 304. In various embodiments, the first plate 302 and the second plate 304 are circular disks manufactured from a thermally conductive material. In various embodiments, the thermally conductive material may be aluminum, copper, titanium, Inconel alloy, or other metal material. In various embodiments, the thermally conductive material of the first plate 302 and the second plate 304 may be a thermally conductive polymer or thermally enhanced polymer such as a composite material that includes other materials to improve thermal conductivity.

In various embodiments, disposed between and coupled to the first plate 302 and the second plate 304 are a plurality of structures 306. In various embodiments, the plurality of structures 306 are manufactured from a thermally conductive material. In various embodiments, the thermally conductive material of the plurality of structures 306 may be aluminum, copper, titanium, Inconel alloy, or other metals and metal alloys. In various embodiments, the thermally conductive material may be a thermally conductive polymer or thermally enhanced polymer such as a composite material that includes other materials to improve thermal conductivity. For example, a thermally enhanced polymer may include a fibrous polymeric material having thermal conductive enhancement materials impregnated or embedded within, the thermal conductive enhancement materials including, for example, metals and metal alloys. In various embodiments, the plurality of structures 306 form a set of passages that reduce a flow area such that, when refrigerant in a gaseous state, as provided by the a compressor, such as compressor 126 of FIG. 2, enters the passages bounded by the first plate 302 and the second plate 304 flowing inward and passes around the plurality of structures 306, heat is removed from the refrigerant in the gaseous state, which allows the refrigerant to condense, transitioning from the gas state into a liquid state. In various embodiments, the density of the passages between the plurality of structures 306 is configured so that the refrigerant in a gaseous state, which has a larger volume, turns into a liquid state as the refrigerant goes through the passages and heat is removed by the thermally conductive material of the first plate 302, the second plate 304, and the plurality of structures 306. In various embodiments, the refrigerant in the liquid state exits the compact radial condenser 127 though an opening in a center of the first plate 302, described hereafter in FIG. 5. In various embodiments, the second plate 304 is a solid disk, i.e. does not have any opening, so as to provide a barrier between the refrigerant side of the compact radial condenser 127 and the airflow side of the compact radial condenser 127.

In various embodiments, in order to dissipate heat that is drawn from the refrigerant in the gaseous state by the first plate 302, the second plate 304, and the plurality of structures 306, air is drawn in by impeller 308 and rejected out between a plurality of cooling fins 310. In various embodiments, the plurality of cooling fins 310 are manufactured from a thermally conductive material. In various embodiments, the thermally conductive material may be aluminum, copper, titanium, Inconel alloy, or other metal material. In various embodiments, the thermally conductive material may be a thermally conductive polymer or thermally enhanced polymer such as a composite material that includes other materials to improve thermal conductivity. In various embodiment, a base edge of the plurality of cooling fins 310 may be coupled to a second side of second plate 304 opposite to a first side of the second plate 304 to which the plurality of structures 306 are coupled. In various embodiments, a third plate, described hereafter in FIG. FIG. 8, similar to the first plate 302 may be coupled to top edge of the plurality of cooling fins 310. In that regard, in various embodiments, the third plate may have an opening in a center of the third plate though which air is drawn in by the impeller 308 and rejected out through a plurality of cooling fins 310 thereby dissipating the heat absorbed by the first plate 302, the second plate 304, and the plurality of structures 306. In various embodiments, the plurality of cooling fins 310 extend radially outward from outer radial edge of the impeller 308 to the edge of the second plate 304. In various embodiments, each of the plurality of cooling fins 310 has a radius R1.

Figure 4:
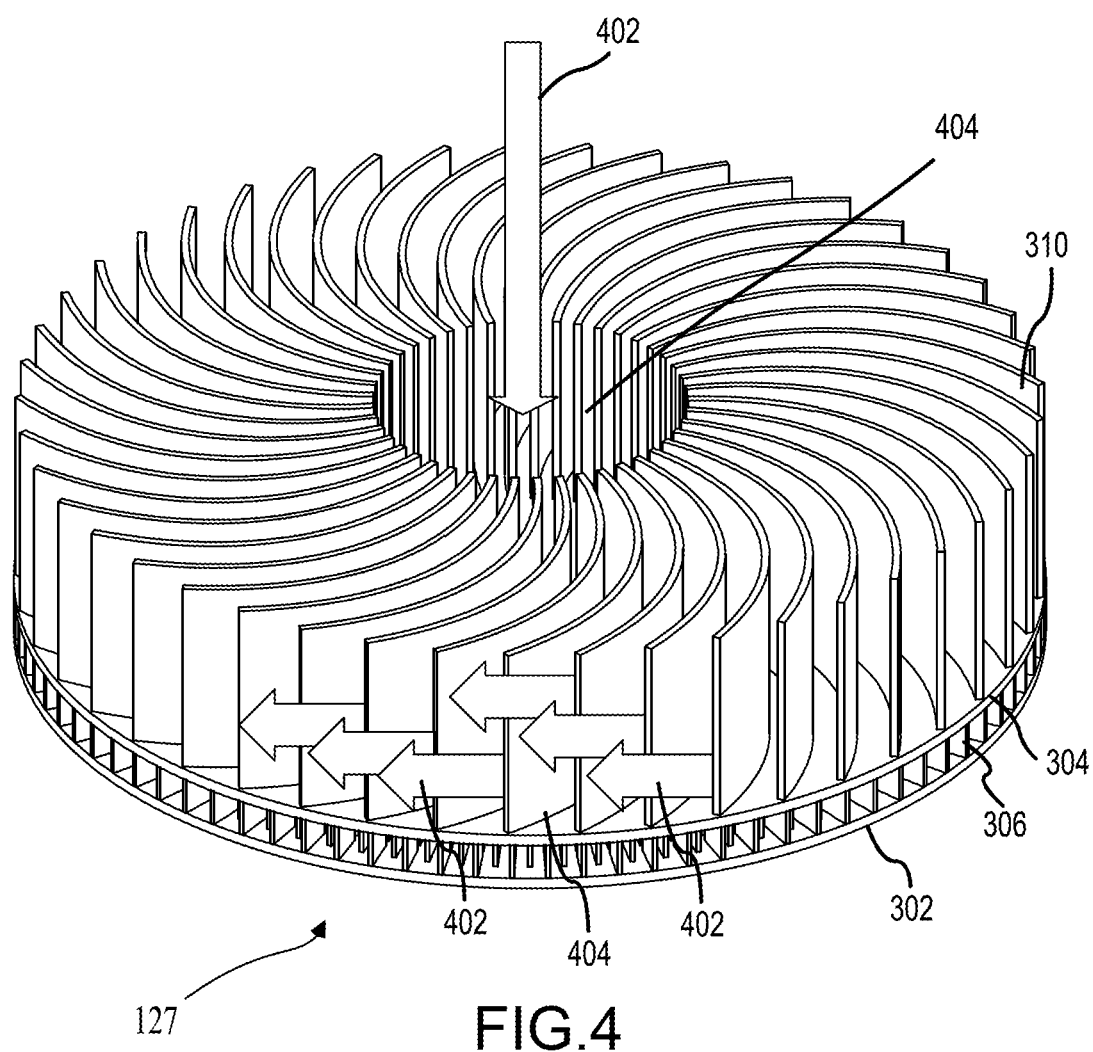
FIG. 4 illustrates an isometric view of a condenser of a HVAC system, in accordance with various embodiments.

Referring now to FIG. 4, an isometric view of the compact radial condenser 127 of the HVAC system is illustrated, in accordance with various embodiments. The compact radial condenser 127 illustrated in FIG. 4 is similar to the compact radial condenser 127 described in FIG. 3. Accordingly, components appearing in FIG. 4, which have already been described in FIG. 3, operate in a similar manner to the operation described for those components in FIG. 3. In difference to FIG. 3, impeller 308 has been removed so as to illustrate that, in various embodiments, the intake of air 402 drawn in by impeller 308 of FIG. 3 is rejected out by passing through spaces 404 between the plurality of cooling fins 310 in order to dissipate heat that is drawn from the refrigerant in the gaseous state by the first plate 302, the second plate 304, and the plurality of structures 306.

Figure 5:
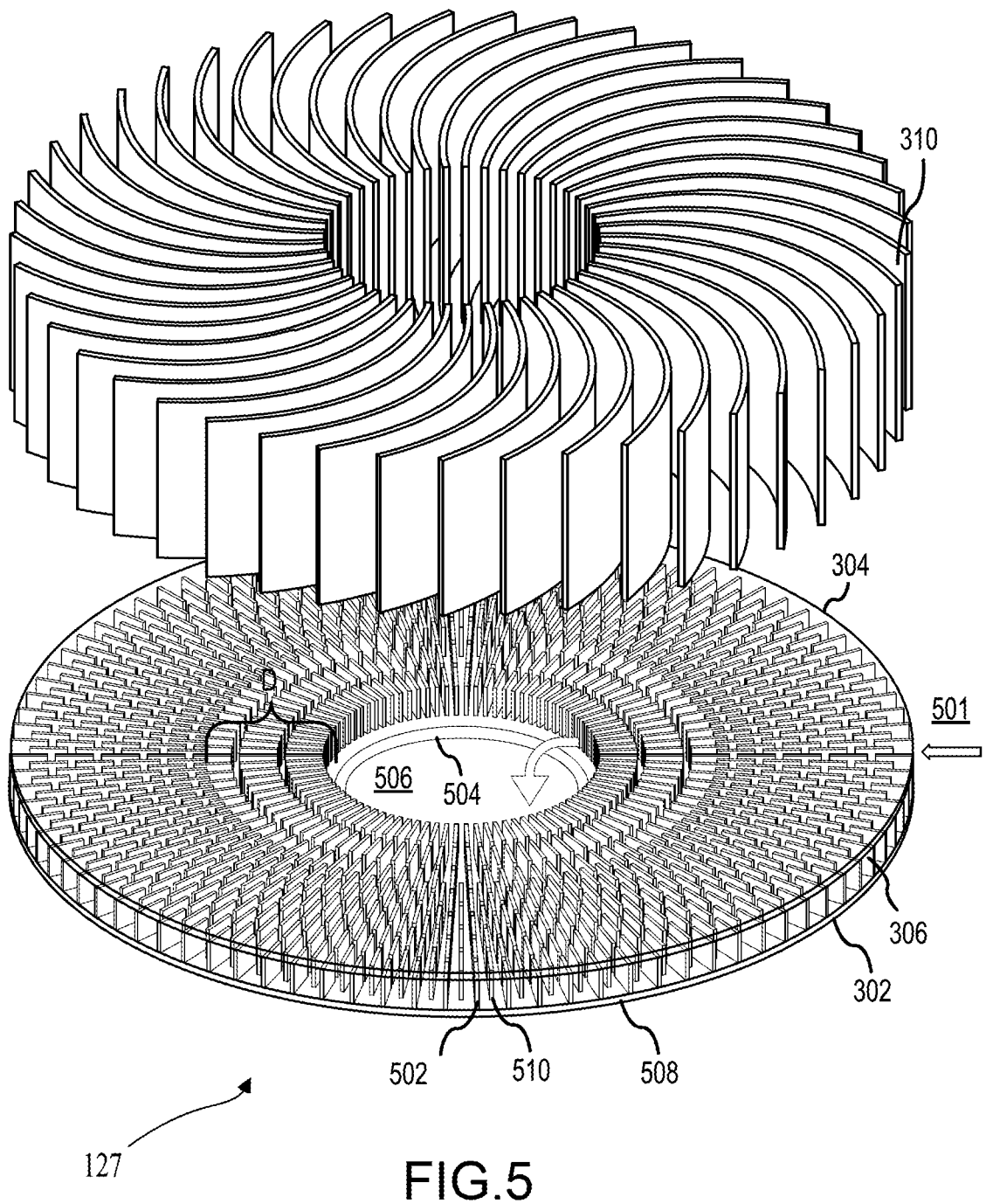
FIG. 5 illustrates an exploded isometric view of a condenser of a HVAC system, in accordance with various embodiments.

Referring now to FIG. 5, an exploded isometric view of the compact radial condenser 127 of the HVAC system is illustrated, in accordance with various embodiments. The compact radial condenser 127 illustrated in FIG. 5 is similar to the compact radial condenser 127 described in FIGS. 3 and 4. Accordingly, components appearing in FIG. 5, which have already been described in FIGS. 3 and 4, operate in a similar manner to the operation described for those components in FIGS. 3 and 4. In various embodiments, when refrigerant 501 in a gaseous state enters the passages bounded by the first plate 302 and the second plate 304 flowing inward and passes around the plurality of structures 306, heat is removed from the refrigerant 501 in the gaseous state, which allows the refrigerant 501 to condense transitioning from the gas state into a liquid state. In various embodiments, the density of the passages between the plurality of structures 306 is optimized so that the refrigerant 501 in a gaseous state, which has a larger volume, turns into a liquid state as the refrigerant 501 passes through the passages and heat is removed by the thermally conductive material of the first plate 302, the second plate 304, and the plurality of structures 306. In that regard, the plurality of structures 306 may include a first set of structures 502 of the plurality of structures 306 that extend radially from an inner edge 504 of an opening 506 in a center of the first plate 302 to an outer edge 508 of the first plate 302. Additionally, the plurality of structures 306 may include a second set of structures 510 of the plurality of structures 306 that extend radially a distance D from the inner edge 504 of the opening 506 in the center of the first plate 302 to the outer edge 508 of the first plate 302. In various embodiments, each of the first set of structures 502 of the plurality of structures 306 may be larger in length than the second set of structures 510 of the plurality of structures 306 and, in various embodiments, a number of structures in each of the first set of structures 502 of the plurality of structures 306 may be more than a number of structures in each of the second set of structures 510 of the plurality of structures 306. In various embodiments, having a larger density of passages between the plurality of structures 306 optimized the flow of refrigerant 501 as it transitions from a gaseous state to a liquid state. In various embodiments, the refrigerant 501 in the liquid state exits the compact radial condenser 127 though the opening 506 in the center of the first plate 302. It is noted that the configuration of the plurality of structures 306 is not limited to straight lines extending radially outward from the opening 506 in the center of the first plate 302. For example, the plurality of structures 306 may be arranged in a spiral configuration, diamond configuration, or a radial configuration, among others, and still be within the scope of this disclosure.

Figure 6A:
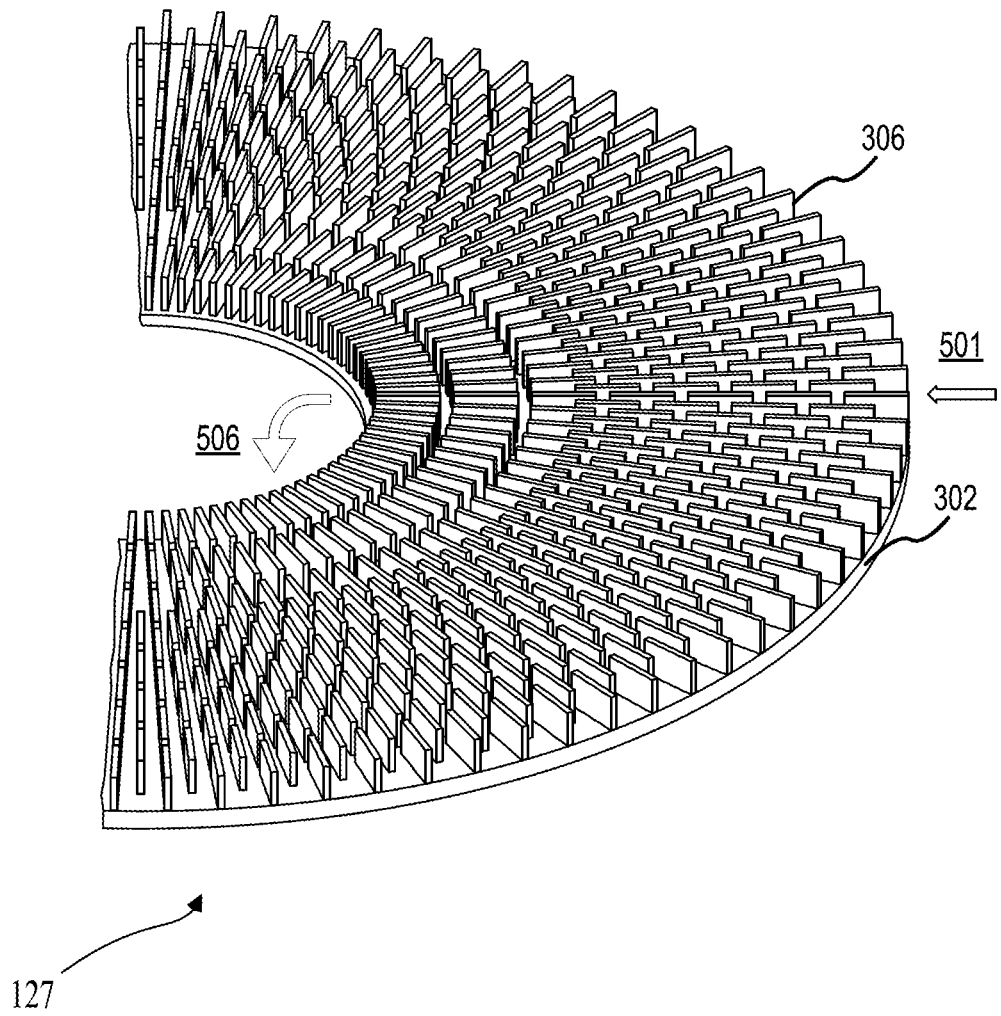
FIGS. 6A and 6B illustrate isometric views of a condenser of a HVAC system, in accordance with various embodiments.
Figure 6B:
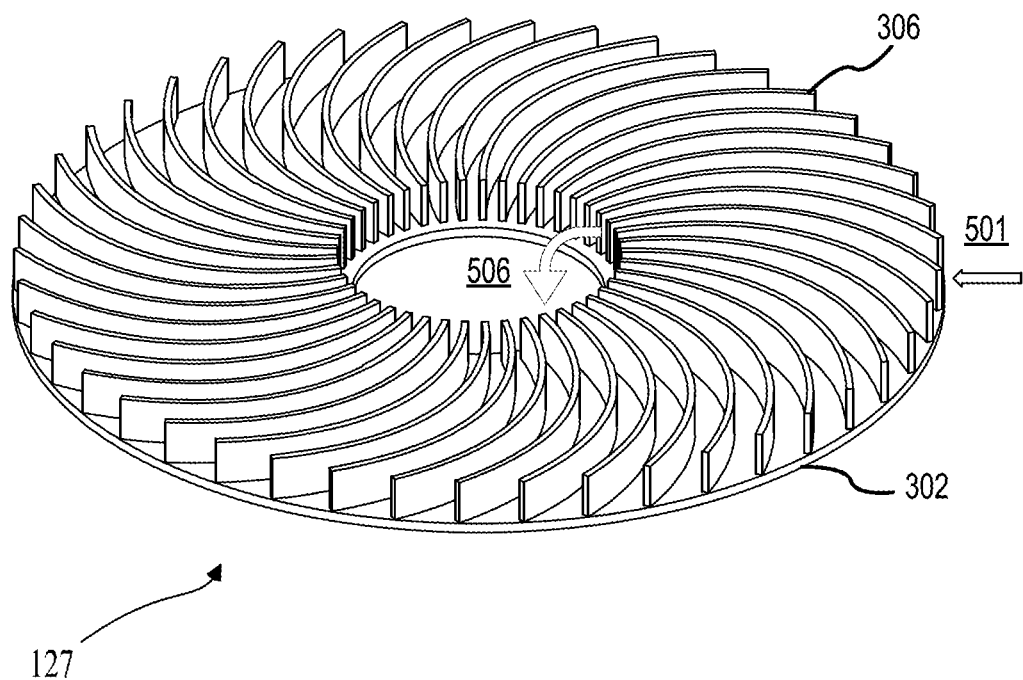

Referring now to FIGS. 6A and 6B, isometric views of the compact radial condenser 127 of the HVAC system is illustrated, in accordance with various embodiments. The compact radial condenser 127 illustrated in FIGS. 6A and 6B is similar to the compact radial condenser 127 described in FIGS. 3, 4, and 5. Accordingly, components appearing in FIGS. 6A and 6B, which have already been described in FIGS. 3, 4, and 5, operate in a similar manner to the operation described for those components in FIGS. 3, 4, and 5. In difference to FIG. 5, FIGS. 6A and 6B illustrate the plurality of structures 306 without the second plate 304 on top. As described in FIG. 5, the compact radial condenser 127 includes the first plate 302 with the plurality of structures 306 coupled thereto. In various embodiments, when refrigerant 501 in a gaseous state enters the passages bounded by the first plate 302 and the second plate 304 of FIG. 5 flowing inward and passes around the plurality of structures 306, heat is removed from the refrigerant 501 in the gaseous state, which allows the refrigerant 501 to condense, transitioning from the gas state into a liquid state. In various embodiments, the refrigerant 501 in the liquid state exits the compact radial condenser 127 though the opening 506 in a center of the first plate 302. As noted in FIG. 5 the configuration of the plurality of structures 306 is not limited to straight lines extending radially outward from the opening 506 in the center of the first plate 302, as illustrated in FIG. 6A. That is, the plurality of structures 306 may be arranged in a spiral configuration, diamond configuration, or a radial configuration, among others, and still be within the scope of this disclosure. For example, in various embodiments, the plurality of structures 306 may be configured to have a radius R2, as illustrated in FIG. 6B.

Figure 7:
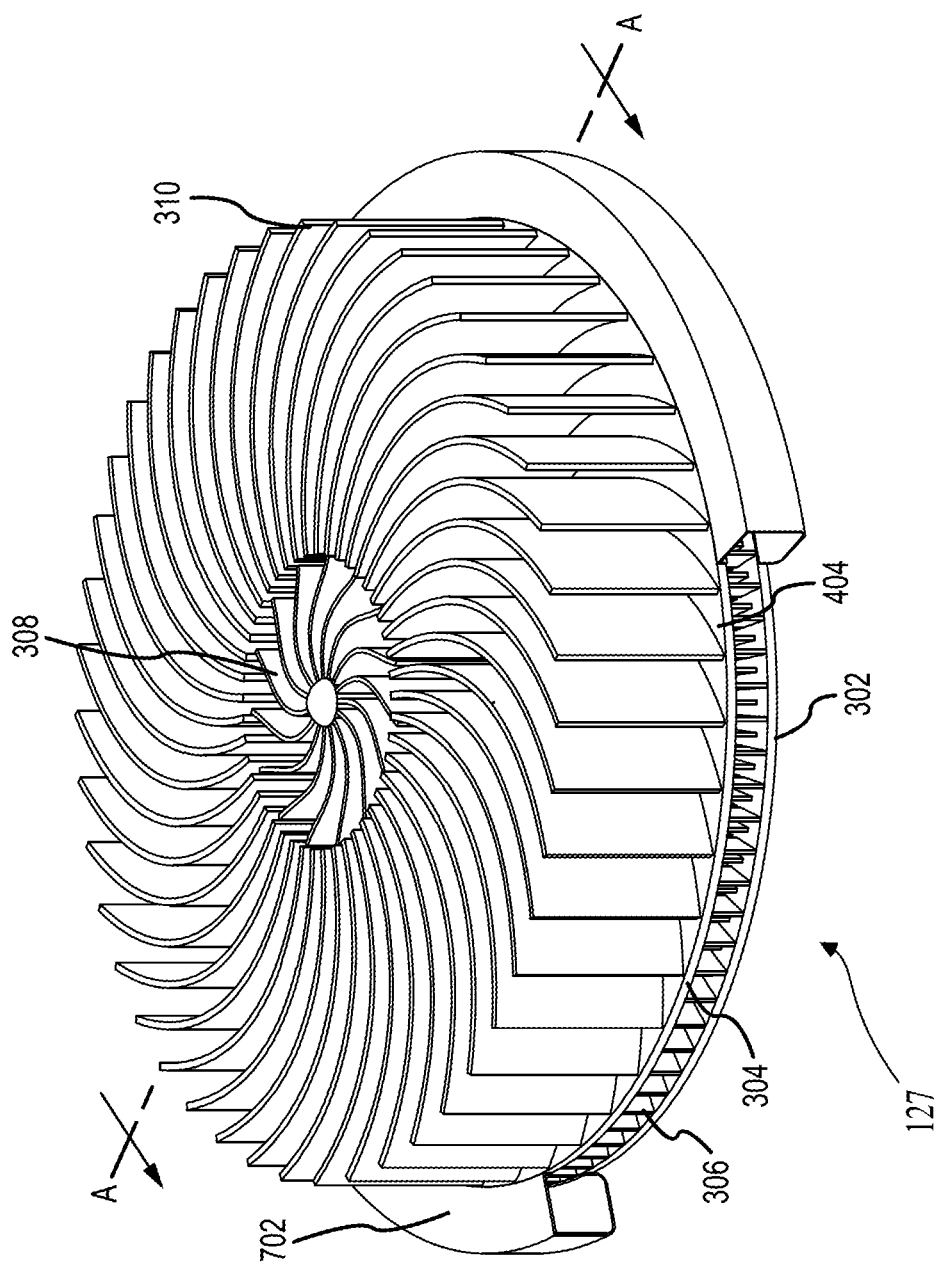
FIG. 7 illustrates an isometric view of a condenser of a HVAC system, in accordance with various embodiments.

Referring now to FIG. 7, an isometric view of the compact radial condenser 127 of the HVAC system is illustrated, in accordance with various embodiments. In various embodiments, refrigerant in the gaseous state enters the outer area between the first plate 302 and the second plate 304 via refrigerant vapor chamber 702, which forms a seal around the outer area between the first plate 302 and the second plate 304. In that regard, refrigerant in a gaseous state received from a compressor, such as compressor 126 in FIG. 2, flows inward between the first plate 302 and the second plate 304 and passes around the plurality of structures 306. Heat is removed from the refrigerant in the gaseous state via the thermal conductivity of the first plate 302, the second plate 304, and the plurality of structures 306 along with the air 402 that is drawn in by the impeller 308 and rejected out by passing through spaces 404 between the plurality of cooling fins 310. In various embodiments, this heat removal process allows the refrigerant to condense, transitioning from the gas state into a liquid state that exits the compact radial condenser 127 though an opening in a center of the first plate 302.

Figure 8:
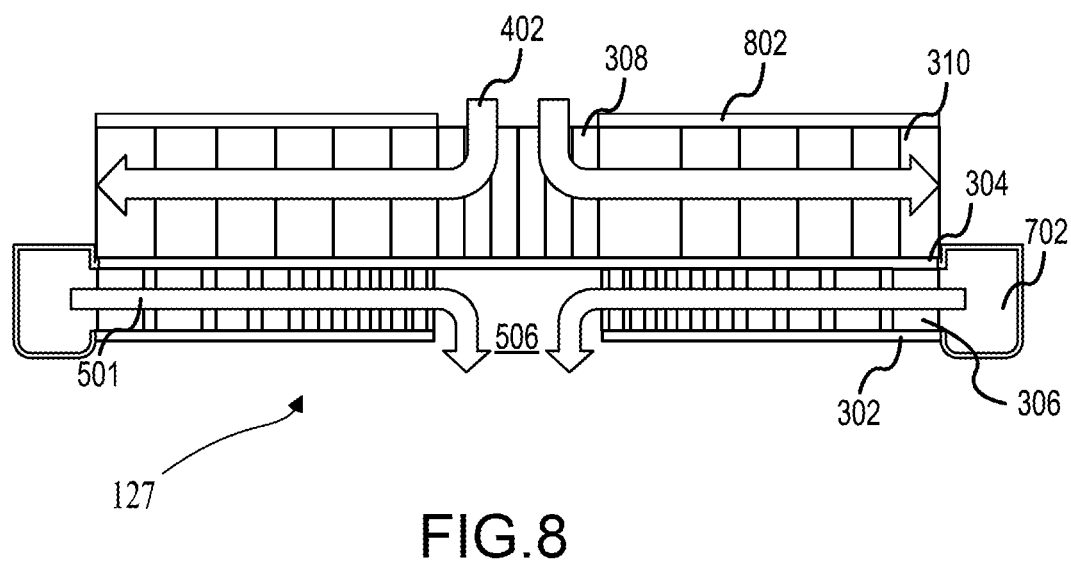
FIG. 8 illustrates a cross-sectional view of a condenser taken along section line A-A of the condenser of FIG. 7, in accordance with various embodiments.

Referring now to FIG. 8, a cross-sectional view of the condenser taken along section line A-A of the compact radial condenser 127 of FIG. 7 is illustrated, in accordance with various embodiments. In various embodiments, refrigerant 501 in the gaseous state enters the outer area between the first plate 302 and the second plate 304 via refrigerant vapor chamber 702, which forms a seal around the outer area between the first plate 302 and the second plate 304. In that regard, refrigerant 501 in a gaseous state received from a compressor, such as compressor 126 in FIG. 2, flows inward between the first plate 302 and the second plate 304 and passes around the plurality of structures 306. Heat is removed from the refrigerant in the gaseous state via the thermal conductivity of the first plate 302, the second plate 304, and the plurality of structures 306 along with the air 402 that is drawn in by the impeller 308 and rejected out by passing through spaces between the plurality of cooling fins 310. In various embodiments, this heat removal process allows the refrigerant to condense transitioning from the gas state into a liquid state that exits the compact radial condenser 127 though the opening 506 in a center of the first plate 302.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A compact radial condenser, comprising:
   a first plate;
   a second plate;
   an impeller;
   a plurality of cooling fins;
   a third plate coupled to a first side of the plurality of cooling fins; and
   a plurality of structures disposed between the first plate and the second plate, wherein heat from a first fluid flowing between the first plate and the second plate and around the plurality of structures is transferred from the first fluid to at least one of the first plate, the second plate, or the plurality of structures, wherein the plurality of structures comprises a first set of structures, wherein the first set of structures are at least one of continuous or discontinuous, and wherein the first set of structures extends radially from proximate an inner edge of an opening in the first plate to an outer edge of the first plate,
   wherein the plurality of cooling fins are coupled to a second side of the second plate, and
   wherein the third plate has an opening in a center though which a second fluid is drawn in by the impeller and rejected through spaces between the plurality of cooling fins.

2. The compact radial condenser of claim 1, wherein the plurality of structures further comprises a second set of structures, wherein the second set of structures extends radially a distance D from the inner edge of the opening in the first plate to the outer edge of the first plate.

3. The compact radial condenser of claim 1, wherein the plurality of structures are configured to provide a density of passages between the plurality of structures that optimizes a flow of the first fluid as the first fluid transitions from a gaseous state to a liquid state.

4. The compact radial condenser of claim 1, wherein the first plate and the second plate are circular disk shaped, wherein the first plate comprises the opening in a center of the first plate, and wherein the second plate is a solid.

5. The compact radial condenser of claim 1, wherein the first plate, the second plate, and the plurality of structures are manufactured from a thermally conductive material, and wherein the thermally conductive material is at least one of aluminum, copper, titanium, a nickel metal alloy, a thermally conductive polymer, or a thermally enhanced polymer.

6. The compact radial condenser of claim 1, wherein a first edge of each of the plurality of structures is coupled to a first side of the first plate and wherein a second edge of each of the plurality of structures is coupled to a first side of the second plate.

7. The compact radial condenser of claim 1, wherein the impeller is disposed in a center of the second side of the second plate, wherein the plurality of cooling fins extend radially outward from an outer radial edge of the impeller to an outer edge of the second plate, and, wherein the plurality of cooling fins are configured to have a radius R1 as the plurality of cooling fins extend radially outward from the outer radial edge of the impeller to the outer edge of the second plate.

8. The compact radial condenser of claim 1, wherein the first fluid comprises a refrigerant, and wherein the second fluid comprises air.

9. The compact radial condenser of claim 1, wherein the plurality of cooling fins are manufactured from a thermally conductive material, and wherein the thermally conductive material is at least one of aluminum, copper, titanium, a nickel metal alloy, a thermally conductive polymer, or a thermally enhanced polymer.

10. A heat transfer system, comprising:
    an expansion device;
    a heat exchanger that is fluidly coupled to the expansion device;

a compressor that is fluidly coupled to the heat exchanger; and a compact radial condenser that is fluidly coupled to the expansion device and the compressor, wherein the compact radial condenser comprises:
- a first plate;
- a second plate;
- an impeller;
- a plurality of cooling fins;
- a third plate coupled to a first side of the plurality of cooling fins; and
- a plurality of structures disposed between the first plate and the second plate, wherein heat from a first fluid flowing between the first plate and the second plate and around the plurality of structures is transferred from the first fluid to at least one of the first plate, the second plate, or the plurality of structures, wherein the plurality of structures comprises a first set of structures, wherein the first set of structures are at least one of continuous or discontinuous, and wherein the first set of structures extends radially from proximate an inner edge of an opening in the first plate to an outer edge of the first plate,
- wherein the plurality of cooling fins are coupled to a second side of the second plate, and
- wherein the third plate has an opening in a center though which a second fluid is drawn in by the impeller and rejected through spaces between the plurality of cooling fins.

11. The heat transfer system of claim 10, wherein the plurality of structures further comprises a second set of structures, wherein the second set of structures extends radially a distance D from the inner edge of the opening in the first plate to the outer edge of the first plate.

12. The heat transfer system of claim 10, wherein the plurality of structures are configured to provide a density of passages between the plurality of structures that optimizes a flow of the first fluid as the first fluid transitions from a gaseous state to a liquid state.

13. The heat transfer system of claim 10, wherein the first plate and the second plate are circular disk shaped, wherein the first plate comprises the opening in a center of the first plate, and wherein the second plate is a solid.

14. The heat transfer system of claim 10, wherein the first plate, the second plate, and the plurality of structures are manufactured from a thermally conductive material, and wherein the thermally conductive material is at least one of aluminum, copper, titanium, a nickel metal alloy, a thermally conductive polymer, or a thermally enhanced polymer.

15. The heat transfer system of claim 10, wherein a first edge of each of the plurality of structures is coupled to a first side of the first plate and wherein a second edge of each of the plurality of structures is coupled to a first side of the second plate.

16. The heat transfer system of claim 10, wherein the impeller is disposed in a center of the second side of the second plate, wherein the plurality of cooling fins extend radially outward from an outer radial edge of the impeller to an outer edge of the second plate, and, wherein the plurality of cooling fins are configured to have a radius R1 as the plurality of cooling fins extend radially outward from the outer radial edge of the impeller to the outer edge of the second plate.

17. The heat transfer system of claim 10, wherein the first fluid comprises a refrigerant, and wherein the second fluid comprises air.

18. The heat transfer system of claim 10, wherein the plurality of cooling fins are manufactured from a thermally conductive material, and wherein the thermally conductive material is at least one of aluminum, copper, titanium, a nickel metal alloy, a thermally conductive polymer, or a thermally enhanced polymer.

* * * * *